(12) United States Patent
Krischker et al.

(10) Patent No.: US 7,613,450 B2
(45) Date of Patent: Nov. 3, 2009

(54) METHOD FOR IDENTIFYING A RECEIVING CAPABILITY OF A TELECOMMUNICATIONS DEVICE

(75) Inventors: Carsten Krischker, Lahstedt/Oberg (DE); Markus Schlözer, Braunschweig (DE); Andreas Tennert, Baddeckenstedt (DE)

(73) Assignee: Siemens Aktiengesellschaft, Munich (DE)

( * ) Notice: Subject to any disclaimer, the term of this patent is extended or adjusted under 35 U.S.C. 154(b) by 285 days.

(21) Appl. No.: 10/517,935

(22) PCT Filed: Jun. 3, 2003

(86) PCT No.: PCT/DE03/01877
§ 371 (c)(1),
(2), (4) Date: Mar. 9, 2005

(87) PCT Pub. No.: WO03/107641
PCT Pub. Date: Dec. 24, 2003

(65) Prior Publication Data
US 2005/0176412 A1 Aug. 11, 2005

(30) Foreign Application Priority Data
Jun. 12, 2002 (DE) ............................ 102 26 104

(51) Int. Cl.
*H04M 3/42* (2006.01)

(52) U.S. Cl. .................. 455/414.1; 455/466; 455/415; 455/412.1; 455/411

(58) Field of Classification Search ............ 455/412.1–412.2, 455/410, 413, 414.1–414.4, 415, 418, 422.1, 455/425, 466, 432.2, 432.3, 458–460, 550.1, 455/557, 567, 564, 67.7, 68, 201; 370/522, 370/524; 379/201.01, 201.02–201.08, 207.13, 379/207.15, 142.04, 142.05, 142.06, 88.13, 379/88.15, 88.17, 88.19, 88.21, 88.23, 88.25, 379/88.27
See application file for complete search history.

(56) References Cited

U.S. PATENT DOCUMENTS
5,440,620 A * 8/1995 Slusky .................. 379/100.07
(Continued)

FOREIGN PATENT DOCUMENTS
EP       1 211 875 A2 *  6/2002
WO         99/12363       3/1999
WO       WO 99/45687  *  9/1999

OTHER PUBLICATIONS

"Control Protocol for Multimedia Communication", ITU-T Recommendation H.245, May 1999, sections 5.2-5.9; XP-002199601.*
XP-002199601 Anonymous—"H.245: Control Protocol for multimedia communication", ITU-T Recommendation H.245 May 1999,.

*Primary Examiner*—Nick Corsaro
*Assistant Examiner*—Kathy Wang-Hurst
(74) *Attorney, Agent, or Firm*—King & Spalding L.L.P.

(57) ABSTRACT

The present invention relates to a method for identifying a telecommunications subscriber. According to the method, a call from a second telecommunications device (MFG2) of a second telecommunications subscriber is first signaled to a first telecommunications device (MFG1) of a first telecommunications subscriber. Device information (GI1), which indicates the type of subscriber data that the first telecommunications device is configured to process, is then sent from a first to a second telecommunications device. Subscriber data (TD2) is subsequently transmitted from the second to the first telecommunication device, in accordance with the information from the first device. It is also conceivable that device information (GI2) can be transmitted from the second to the first telecommunications device, in accordance with which subscriber data (TD1) can finally be transmitted from the first to the second telecommunications device. The use of device information that is exchanged between two telecommunications devices and indicates which subscriber data should be transmitted to the respective other telecommunication device thus permits a reduction in the data flow between two telecommunications devices with respect to subscriber data, as only the desired subscriber data is transmitted.

4 Claims, 3 Drawing Sheets

U.S. PATENT DOCUMENTS

| | | | |
|---|---|---|---|
| 5,592,546 A * | 1/1997 | Takahashi | 379/355.05 |
| 5,764,731 A * | 6/1998 | Yablon | 379/88.15 |
| 6,167,264 A * | 12/2000 | Palviainen et al. | 455/433 |
| 6,535,596 B1 * | 3/2003 | Frey et al. | 379/201.01 |
| 6,556,820 B1 * | 4/2003 | Le et al. | 455/411 |
| 6,622,151 B1 * | 9/2003 | Hamamoto et al. | 707/202 |
| 2001/0002365 A1 * | 5/2001 | Minakuchi et al. | 455/556 |
| 2002/0044634 A1 | 4/2002 | Rooke et al. | |
| 2002/0181683 A1 * | 12/2002 | Mani | 379/201.01 |
| 2003/0063590 A1 * | 4/2003 | Mohan et al. | 370/338 |
| 2004/0203941 A1 * | 10/2004 | Kaplan et al. | 455/466 |
| 2004/0252695 A1 * | 12/2004 | Rasanen et al. | 370/395.2 |

* cited by examiner

METHOD FOR IDENTIFYING A RECEIVING CAPABILITY OF A TELECOMMUNICATIONS DEVICE

BACKGROUND OF THE INVENTION

The present invention relates to a method for identifying a telecommunications subscriber and a telecommunications device for carrying out the method.

Communication between individuals using telephony, especially mobile telephony, is becoming increasingly important. For telecommunications subscribers it is important, particularly when establishing a telephone connection, to know the identity of the caller before answering the call. The called telecommunications subscriber can use various facilities to display the identity of the caller; for example, in the form of the name and telephone number of the caller. Usually, there is a database stored on the telecommunications device of the called telecommunications subscriber in which telephone numbers and associated names are saved. For calls where the telephone number of the caller is usually transmitted, the telecommunications device of the called subscriber can determine the name of the caller from the database. The telephone number and the name of the caller are displayed.

There is, however, a problem when a caller calls another telecommunications subscriber, the recipient, for the first time. In this case, the recipient has probably not stored an entry in the database in his/her telecommunications device and so the name of the caller cannot be displayed.

To overcome this problem, a caller can store specific personal identification information on his/her communications device and then transfer this during call signaling to the communication device of a particular recipient. This type of identification information could, for example, contain name, company, e-mail address in text form and other specific information as audio data or image data.

One disadvantage of this method during call signaling, in which a caller sends all his/her available identification information or subscriber data to the recipient, is that the caller transfers a large volume of data to the recipient with every call or call signaling, irrespective of the performance of the telecommunications device of the recipient. Not only is it costly for the caller to transfer large data volumes, it is possible that the telecommunications device of the recipient is not able to process all the caller data that has been transferred. If, for example, the telecommunications device of the recipient either does not have a display facility or does not have a suitable display facility, the device cannot display any image files transferred by the caller that would make transferring any image data to such a recipient inappropriate and superfluous.

Documents WO 99/45687 and "ANONYMOUS: 'H.245: Control Protocol for multimedia communication' ITU-T RECOMMENDATION H.245, XX, XX, Mai 1999 (1999-05), XP002199601" discuss exchanging the properties or capabilities of terminals to establish that the signals sent from one to the other terminal can be correctly received before setting up a communications link such as voice or video link between the two terminals.

The present invention seeks to enable subscriber identification of a subscriber in a telecommunications connection with a minimum flow of data.

SUMMARY OF THE INVENTION

A method for identifying a telecommunications subscriber in accordance with an embodiment has the following stages.

A call from a second telecommunications device of a second telecommunications subscriber (the caller) is first signaled to a first telecommunications device of a first telecommunications subscriber (the recipient). As such, the first telecommunications subscriber is made aware by his/her telecommunications device that the second telecommunications subscriber intends to set up a telecommunications connection with him/her. Advantageously, the signal is transferred to the first telecommunications subscriber via a telecommunications network. If the first telecommunications device has received the signaling from the second telecommunications device, then device information that indicates the type of subscriber data that the first telecommunications device is configured to process is sent from the first to the second telecommunications device. The term "configured" refers to either the first telecommunications device only having a certain range of features (for example, it can play back or send audio files, but does not have a display suitable for showing image files) or the first telecommunications subscriber having for example, set up his/her telecommunications device so that only certain subscriber data should be received which is indicated to the second telecommunications device using device information. After receiving the first device information, subscriber data is subsequently transmitted from the second telecommunications device to the first in accordance with the first device information. This simply refers to subscriber data transmitted to the first telecommunications device matching the criteria of the first device information and hence represents the subscriber data that the first telecommunications subscriber can or wants to receive.

In accordance with the method already described, only certain subscriber data is transmitted from the second telecommunications device to the first depending on the settings or configuration or performance capability of the first telecommunications device which reduces the volume of data transferred to the absolutely essential which, in turn, results not only in reduced costs for the caller but also faster transmission speed. Furthermore, subscriber data with particular contents are not transmitted to telecommunications devices which are not able to process such subscriber data or parts thereof.

In a preferred embodiment, second device information is sent from the second (caller) to the first (recipient) telecommunications device during call signaling in this direction which indicates the type of subscriber data that the second telecommunications device is configured to process. Analogously to the recipient, the caller also may send device information to the recipient (the first telecommunications subscriber) so that subscriber data with a selected or particular content also may be returned to the caller. This has the advantage that the caller also knows the identity of the recipient. Unlike usual telecommunications connections, in which the caller enters a particular number (telephone number) into his/her telecommunications device and hopes that he/she has selected the correct recipient, in this embodiment the caller receives "active" feedback from the recipient that either confirms to the caller the selection of the required recipient or indicates that an error has been made.

In a further embodiment, the subscriber data (whether from the first telecommunications device to the second or from the second telecommunications device to the first) includes not only a telephone number, as is possible in the prior art, but also multimedia content. Multimedia content may include text data (data as numbers, letters and symbols) and/or audio data (data as music or the voice of a telecommunications subscriber) and/or video data or image data (data as a static image or a sequence of images; for example, in QCIF format (Quarter Common Intermediate Format) or a JPG format (developed by the Joint Photographic Experts Group)). Text data may relate to the title, name, first name, company, function, e-mail address or reason for calling, whereas the image information may, for example, show the face of the telecommunications subscriber. Using multimedia content in subscriber data enables comprehensive identification or representation of a telecommunications subscriber. Furthermore, it is advantageous if the subscriber data being transferred is not only transferred during call signaling, to transmit the identity of the caller to the other telecommunications subscriber, but also that the information transferred is stored on the receiving telecommunications device in a special format or special structure. If, for example, name, first name, e-mail address and fax number are transmitted by a caller, this information can be stored in designated memory areas of the receiving telecommunications device such that, for example, to set up an intended e-mail connection, only the name or first name of the e-mail recipient has to be selected via a user interface and the e-mail address is automatically inserted into the planned e-mail. As such, subscriber data can be stored as a type of electronic business card, the contents of which can be processed separately.

In a further advantageous embodiment, the first and/or second telecommunications device stores transmission information that indicates which subscriber data has already been transmitted by the other telecommunications device. It is possible that the transmission information is transmitted as a form of "delivery confirmation" from one telecommunications device to the other together with the subscriber data. It also is, however, possible that the telecommunications device receiving the subscriber data indicates which parts of the subscriber data have already been received. This indication or storage of transmission information is, for example, advantageous if a particular caller repeatedly calls the same recipient. It is assumed that, for example, when the caller called the recipient for the first time that all the subscriber data was transferred that could be transferred in accordance with the device information from the recipient (first telecommunications subscriber or first telecommunications device). If the same caller calls the recipient for a second time, then the telecommunications device of the recipient can, for example, detect from the telephone number transmitted during call signaling that the caller has called before and transferred his/her subscriber data so that the recipient's device information can be adapted and simply indicate "new" parts of the subscriber data that have not yet been transferred from the particular caller. For example, if during the first call or the first call signaling from the particular caller, name, first name company and an image of the caller have been transferred, then those components can be excluded from the recipient's device information to be sent to the caller and, for example, only the e-mail address included (which has not yet been transferred). It is therefore possible by checking the stored transmission information for a particular caller (second telecommunications subscriber or second telecommunications device) to draw conclusions about previously stored subscriber data and hence adapt the transmitted device information. This reduces the volume of data to be transmitted between two telecommunications devices (subscriber data).

In a further embodiment, historical data that indicates the transmitted subscriber data can be assigned to the transmission information. This historical data can, for example, include time or version details. Furthermore, "current" historical data can be assigned to subscriber data saved in a telecommunications device. By using this historical data, the data flow for subscriber identification can be further reduced.

If, for example, after call signaling from the second telecommunications device to the first telecommunications device, the latest received transmission information with the historical data is transmitted by the first telecommunications device to the second telecommunications device along with the first device information, then the second telecommunications device can compare the received historical data of the first telecommunications device with the current historical data of the subscriber data in the second telecommunications device, in order to decide whether it is necessary still to transmit subscriber data to the first telecommunications device. If the current historical data is different from the received historical data of the first telecommunications device (i.e., the current historical data shows a higher version number or a later time stamp), then the first telecommunications device has not received the latest version of the subscriber data so that the stage of transmitting subscriber data from the second to the first telecommunications device should be implemented. Each component or element of the subscriber data (name, first name, company etc.) can be assigned its own historical data or the entire record can be assigned standard historical data. Accordingly, it is possible that the transmission information for each subscriber data element has its own individual historical data or that there is uniform historical data for all subscriber data elements.

It is worth noting that the use of historical data is not just confined to transmitting subscriber data from the second telecommunications device to the first telecommunications device, but should also be considered when transmitting subscriber data from the first telecommunications device to the second telecommunications device. As such, the second telecommunications device together with its device information can also transmit transmission information with historical data to the first telecommunications device, so that the first telecommunications device can also detect which version of its subscriber data is stored on the second telecommunications device.

In another embodiment, it is therefore possible to transmit historical data stored in the transmission information in the device information so that the complexity of the method is reduced since during call signaling only the device information and not additional transmission information is transmitted to the other telecommunications device.

In a further embodiment, a telecommunications device is created to implement the method described above. The telecommunications device includes a first memory to store subscriber data. Furthermore, it includes a facility to receive first device information of a second telecommunications device that indicates the type of subscriber data that the first telecommunications device is configured to process. Furthermore, a facility is envisaged for transmitting particular subscriber data from the first memory to the second telecommunications device depending on the device information received from this telecommunications device. Subscriber data is advantageously transmitted via a telecommunications network.

In another embodiment of the telecommunications device, the telecommunications device has, in particular for carrying out a method as described above, a second memory for saving second device information specific to the telecommunications device that indicates the type of subscriber data that the telecommunications device is configured to process. Furthermore, the telecommunications device has a facility to transfer the second device information from the second memory to the other telecommunications device. The second device information is advantageously transmitted via a telecommunications network. The telecommunications device also has a facility for receiving subscriber data from the other telecommunications device depending on the second device information transmitted to it.

In a further embodiment, the subscriber data contained in the first memory has multimedia content such as text data and/or audio data and/or video data. The subscriber data, in particular the text data includes for example the title, name, first name, company, function and e-mail address of the subscriber; it may also contain a voice message or an image of the subscriber.

In yet another embodiment, the telecommunications device has a further third memory to store transmission information that indicates which subscriber data has already been transmitted by another telecommunications device. In the third memory, the subscriber data transmitted from another telecommunications device can be saved together with the appropriate transmission information.

The telecommunications device may be embodied as a computer with data transmission functions or as a mobile phone. Such a mobile phone and a telecommunications network for transmitting data can, for example, work in accordance with the UMTS (Universal Mobile Telecommunication Service) standard or the GSM (Global System for Mobile Communication) standard. It is conceivable that the telecommunications device is embodied as a cordless telephone that works, for example, in accordance with the DECT (Digital European Cordless Telephone) standard. Depending on which telecommunications device, whether mobile phone or cordless telephone etc, is to be used to set up the telephone connection, the appropriate data or information must be transmitted via an appropriate network such as a mobile radio network or a public telephone network.

Additional features and advantages of the present invention are described in, and will be apparent from, the following Detailed Description of the Invention and the figures.

DETAILED DESCRIPTION OF THE INVENTION

Figure 1:
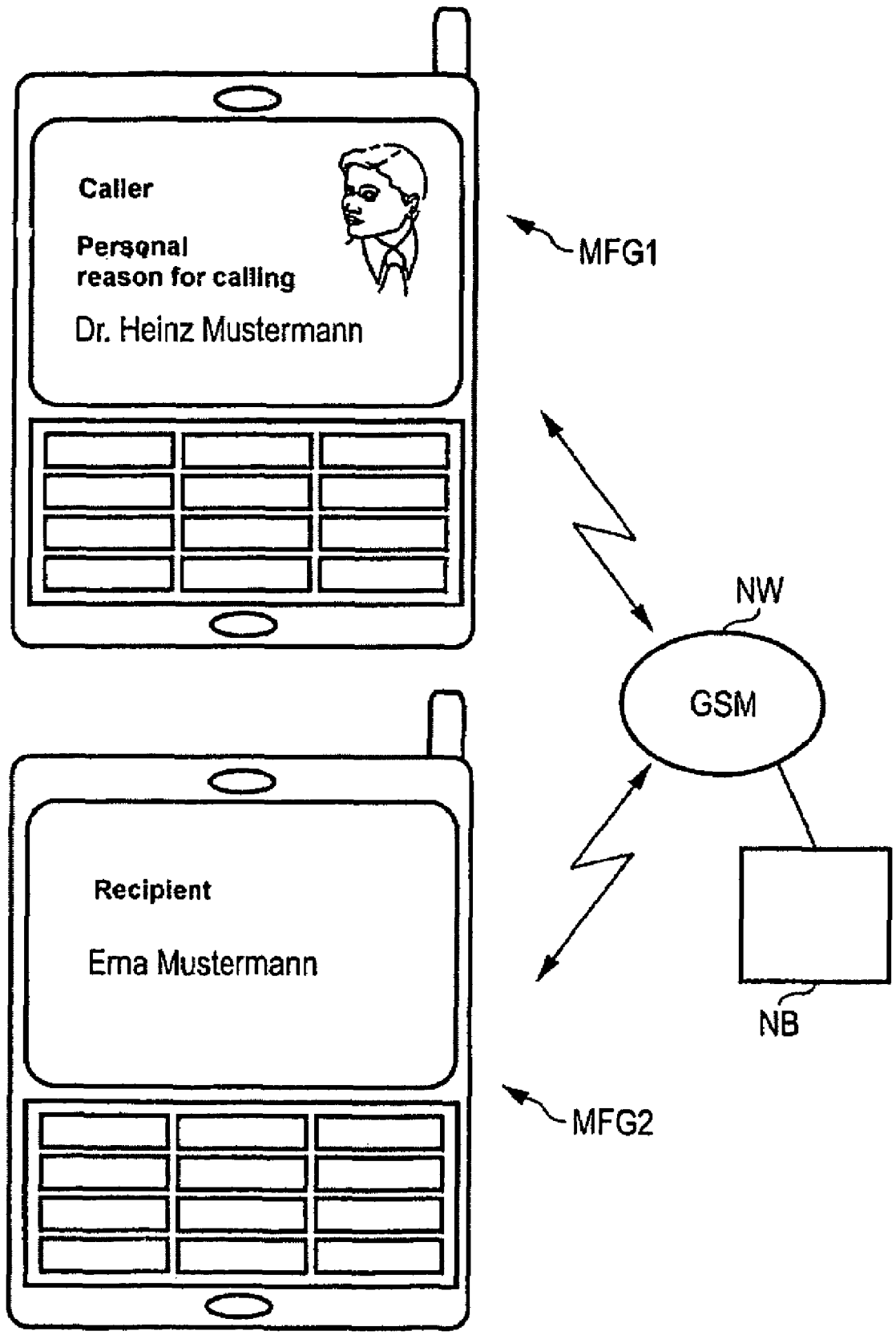
FIG. 1 is a schematic diagram of a telecommunications system for executing the present invention.

FIG. 1 shows a schematic diagram of a telecommunication system or a telecommunication arrangement which has a first telecommunications device MFG1 and a second telecommunications device MFG2 which are linked via an air interface (shown by the symbol "Z") with a telecommunications network NW. The network NW, represented here by a GSM (Global System for Mobile Communication) switching unit, is also connected to a processing unit of a network operator or a service provider NB. In the case shown in FIG. 1, the telecommunications devices MFG1 and MFG2 are shown as mobile phones that work in accordance with the GSM standard, although it is also conceivable that the mobile telephones and the network NW work in accordance with the UMTS (Universal Mobile Telecommunication Service) standard. It is further conceivable that the present invention could be carried out using not only mobile phones (MFG1, MFG2) but also other telecommunications devices such as a cordless telephone, a conventional corded telephone, a fax machine or a computer with a function for connecting to the internet. In particular, when using the alternative telecommunications devices just described, it is also conceivable that these devices do not or do not only remain in contact or make contact with one another via a GSM network but also via a public telephone network (PSTN: Public Switch Telephone Network).

A subscriber or user of a telecommunications device communicates with other subscribers or a network operator (NB) by setting up a call to transfer voice or data or by sending an SMS (Short Message Service) message. GSM telephone networks can transfer data as CLID (Calling Line Identification) information and/or as USSD (Unstructured Supplementary Service Data) information.

As such, user-defined data can be transferred via a GSM network from one subscriber to another.

Figure 2:
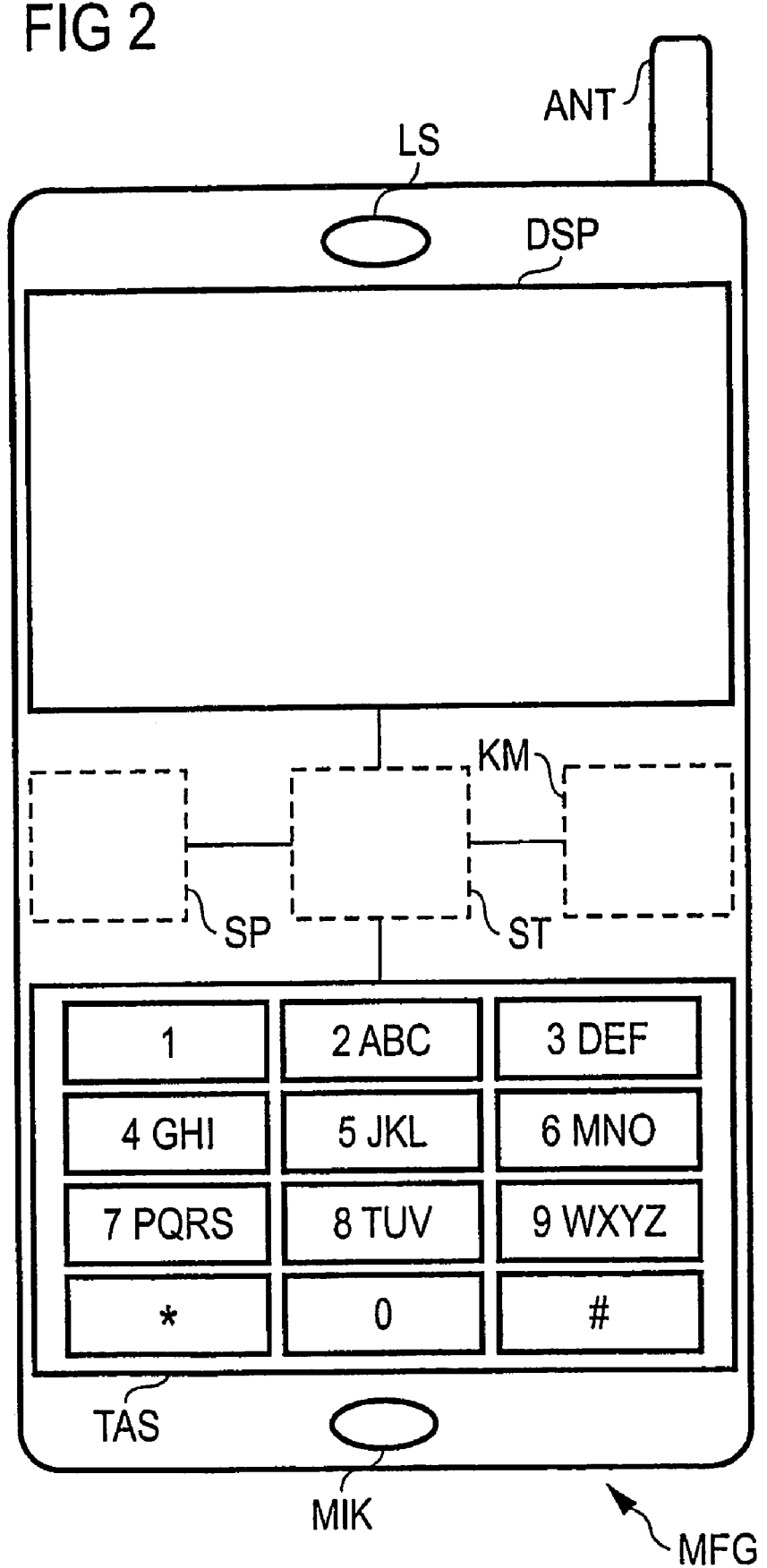
FIG. 2 is a schematic and detailed diagram of a telecommunications device via which the method according to the present invention can be carried out.

FIG. 2 shows a detailed schematic diagram of a mobile phone MFG that can be used as the mobile phone MFG1 and/or MFG2 in FIG. 1. The mobile phone MFG has a control unit ST that has, in particular, a microprocessor and a program memory. The present invention can be effected through processing carried out by program codes stored in the program memory.

As is shown in FIG. 2, the control unit ST is linked to a display DSP that can, for example, be an LCD (LCD: Liquid Crystal Display) display and used for displaying letters, numbers, symbols and images. Furthermore, the control unit ST is linked to a keyboard TAS which in the example shown has 12 keys (the numbers "0-9", the "#" symbol and the "*" symbol). The control unit is also linked to a memory SP that has several sections in which subscriber-specific data can be stored. The control unit ST is also linked to a communications module KM that has several components. It has a microphone MIK and loudspeaker LS (as peripheral components) that are used in conventional telephony (in operating status) where voice signals are transmitted. The loudspeaker LS and microphone MIK are linked to a processing unit (in the communications module KM) for processing or converting analog and/or digital signals. In this case, such a processing unit is then linked to a GSM radio module (also in the communications module KM) that transmits voice and/or data using an antenna ANT via an air interface to a base station of a communication network or receives the same from this.

It is worth noting that the control unit ST, the memory SP and the communication module (without its peripheral components, namely MIK, LS and ANT) are indicated by dashed lines since they are usually inside the mobile phone MFG and not seen by the user.

Figure 3:
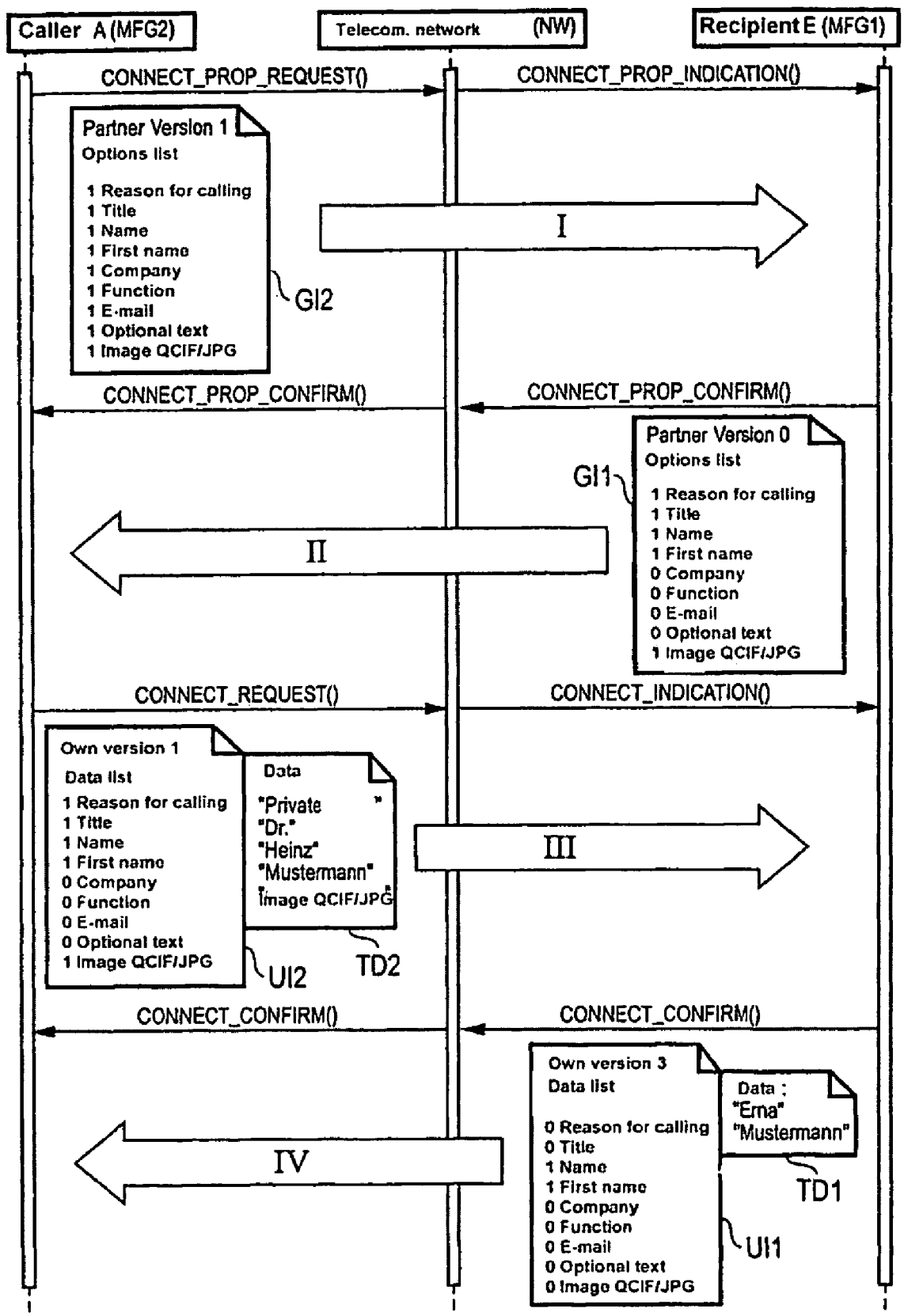
FIG. 3 is a flow diagram showing subscriber identification during call signaling.

A method for identifying a telecommunications subscriber in accordance with the present invention as shown in FIG. 3 in conjunction with FIGS. 1 and 2 is described below.

Firstly, subscriber data which may include the title, name, first name, company, function (in the company), e-mail address, optional text, reason for calling and an image of the caller associated with the calling mobile phone MFG is stored in a first memory section of the memory SP of the mobile phone MFG2. In a second memory section of the memory SP, specific device information for the second mobile phone MFG2 is also stored that indicates which subscriber data should be transmitted during call signaling from a further telecommunications device or mobile phone; i.e., for which subscriber data the second mobile phone is equipped or set to process. In a third memory section of the memory SP, transmission information (where it is available) for subscriber data of a particular further telecommunications subscriber or telecommunications device is stored that was already transmitted when a previous telecommunications connection was set up from the further telecommunications device. It is worth noting that the subscriber data stored in the memory SP, the device information, any transmission information and the release information described below could be entered or changed using the keyboard TAS as part of a data management application shown on the display.

To improve the method of identifying subscribers, current historical data is assigned to the subscriber data stored in the first memory section of memory SP for identifying this subscriber data which may also be stored in the first memory section of memory SP. To be precise, in the present example, subscriber data stored in the first memory section is assigned a version number (as current historical data). Accordingly, the device information stored in the second memory section of the memory SP is assigned a version number that, for example, can be derived from transmission information further transmitted by a particular further recipient. If there is no version number for a particular further subscriber, the device information does not receive an entry.

Analogous to the first mobile phone MFG1 where subscriber data of a first subscriber is stored in the first section of a memory of the first mobile phone MFG1, first device information is stored in a second memory section of the memory SP and any available transmission information of at least one further subscriber is stored in the third memory section of a memory SP. It is worth noting that in the third memory section of memory SP of a mobile phone MFG (MFG1, MFG2) the transmission information of one or more further telecommunications subscribers can be stored with whom a communication link or call signaling for setting up a communication link has already been made. It is worth noting also that in the third memory section of memory SP (of MFG1 and/or MFG2), subscriber data transferred from the other telecommunications device can also be stored in addition to the transmission information. The third memory section of memory SP can contain a database which itself contains subscriber data assigned to a certain other subscriber and any transmission information transmitted for this subscriber.

The case is described below in which a second telecommunications subscriber, hereinafter to referred to as Caller A, wants to set up a communication link, in particular a telephone connection for transmitting voice with a first subscriber hereinafter referred to as Recipient E using his/her mobile phone MFG2 via a telecommunications network such as the GSM network in FIG. 1. Caller A firstly selects Recipient E as a communications partner. To select the communication partner, a list of communication partners can be shown on the display DSP of the mobile phone MFG2 whose telephone number and any subscriber data or transmission information is already stored. After selecting the appropriate communication partner, in this case Recipient E, the device information GI2 to be sent to the Recipient E is adapted. Where available, the historical data in the form of a version number (here version number "1") of subscriber data for Recipient E that has already been transferred is taken from the associated transmission information and incorporated into the device information GI2. As can be seen in FIG. 3, the device information GI2 contains a version number of the partner, that is the previously transmitted subscriber data for the partner (Recipient E) and a list of optional information which Caller A or his/her telecommunications device can or wants to receive. As such, where Recipient E is able or wants to send the appropriate subscriber data, he/she should transmit all optional subscriber data (reason for calling, title, name, first name, company, function, e-mail address, optional text, image) that is identified by a "1" before the appropriate specific data ("1" means send; "0" means do not send) in accordance with the device information GI2.

After adapting the device information GI2, Caller A or his/her mobile phone MFG2 begins setting up a communication link to Recipient E. It sends an appropriate call signaling query to the telecommunications network that, in turn, transfers the call signaling to the mobile phone MFG1 (Step 0). A telephone number of Caller A can be forwarded to the Recipient E or the mobile phone with the call signaling. Further, in a Step I during call signaling a message CONNECT PROP REQUEST( ) can be sent with the device information GI2 to the telecommunications network that forwards the device information GI2 with a message CONNECT PROP INDICATION( ) to the mobile phone MFG1 of the Recipient E.

Once Recipient E is known to Caller A, then in the mobile phone MFG1 appropriate device information GI1 can be adapted to Caller A, in which from any existing transmission information of Caller A the version number can be taken from previously transmitted subscriber data and incorporated into the device information GI1. In this case, the version number of the stored transmission information or subscriber data of the partner (of Caller A) has the value "0". In contrast to the device information GI2, Recipient E has set his/her device information GI1 such that he/she does not want to receive the company, function, e-mail address and optional text from Caller A that is shown by a "0" before the appropriate option.

Then, a mobile phone MFG1 of Recipient E transmits in a Step II the set or adapted device information GI1 with a message CONNECT PROP CONFIRM( ) to the telecommunications network NW that, in turn, forwards the device information GI1 with a message CONNECT PROP CONFIRM( ) to Caller A.

Once the mobile phone MFG2 has received the device information GI1, it can then prepare the subscriber data for transmission that Recipient E wishes to receive. It is assumed that the subscriber data stored in the mobile phone MFG2 has a current version number "1" and is therefore more up-to-date than the subscriber data stored in the mobile phone MFG1 from Recipient E with version number "0". Then, in a Step III the required subscriber data TD2 including appropriate transmission information UI2 with a message CONNECTREQUEST( ) is transmitted to a telecommunications network NW that, in turn, forwards the subscriber data including the transmission information with a message CONNECTINDICATION( ) to Recipient E or his/her mobile phone MFG1. As can be seen, the subscriber data TD2 only contains the components reason for calling, title, name and image of Caller A. With the transmission information UI2, Caller A also transmits a current version number (own version 1) of the recently transmitted subscriber data TD2. The transmitted subscriber data TD2 including the transmission information UI2 can then be stored in a third memory section of the memory SP of the mobile phone MFG1.

In a Step IV, finally, the subscriber data TD1 including the appropriate transmission information UI1 is sent from the Recipient E with message CONNECTCONFIRM( ) to the telecommunications network NW that, in turn, in a further message CONNECT CONFIRM( ) forwards the subscriber data TD1 including the transmission information UI1 to the Caller A. It is assumed that the subscriber data stored in the mobile phone MFG1 has a current version number "3" and is therefore more up-to-date than the subscriber data stored in the mobile phone MFG2 from Caller A with version number "1". As can be seen in FIG. 3, Recipient E simply transmits his/her name and first name ("Mustermann", "Erna") and not all the optional components that Caller A was prepared to receive as per the device information GI2. The transmission of only particular components is based on release information that can be determined for a telecommunications subscriber.

This type of information or release information which indicates which subscriber data a subscriber or his/her telecommunications device is prepared to transmit to a further telecommunications device, can, for example, be stored in a fourth memory section of the memory SP of a telecommunications device or mobile phone. The release information can be determined individually by a subscriber or user of a telecommunications device. The release information can then be saved as per the list where a "0" before a subscriber data components refers to this component not being transmitted and a "1" refers to the subscriber data component being transmitted.

After receiving the subscriber data of the relevant other mobile phone, the subscriber data can then be shown on the display "DSP" of the mobile phone as is shown, for example, in FIG. 1. The display of the mobile phone MFG1 of Recipient E shows the message that the "Caller" is "Dr. Heinz Mustermann" who has a "personal reason for calling" and looks like the attached image. Correspondingly, on the display of the second mobile phone MFG2 of Caller A simply shows that the "Recipient" is "Erna Mustermann".

In such a method for subscriber identification in which multimedia data is transmitted during a call or call signaling, there are two distinct stages in the method. In the first stage of the method (corresponding to Step I, II), information (namely device information) is exchanged between the relevant telecommunications devices which indicates which subscriber data the relevant telecommunications device is prepared to receive or process from the other telecommunications device. In a second stage of the method (Steps III, IV), the subscriber data is sent to the other telecommunications device in accordance with the previously transmitted device information. As a result of the prior exchange of device information, only the required subscriber data is transmitted which, particularly in the case of subscriber data with multimedia content (audio files or image files), results in a significant reduction in the data flow if certain parts of the subscriber data is excluded from the transmission.

As has been explained with reference to the method for subscriber identification shown in FIG. 3, two different aspects can be implemented to reduce the data flow between the telecommunications devices in conjunction with the use of device information. Firstly, it is possible to indicate particular requests or which components of the subscriber data are supported by the telecommunications device which should be sent from a further telecommunications device with which a communication link is to be set up. This is the first possible way of reducing the data flow. It is worth noting that in Step IV of FIG. 3, a particular subscriber can reduce the data flow still further by defining release information which transmits even fewer components of subscriber data to a further telecommunications device than was requested in the device information.

A further aspect of the reduction of the data flow lies in the use of historical data (version numbers in FIG. 3) which prevents previously transmitted subscriber data (with the same version number) being transmitted every time a communication link or call signaling is set up. As such, if in a (first) telecommunications device subscriber data with a particular version number is already stored which using device information on call signaling is to be transmitted to a further telecommunications device, and the further telecommunications device detects that the current version number of the stored subscriber data is that same as the transmitted version number, then in this case it is no longer necessary to transmit the subscriber data. In this case, the subscriber data already stored in the telecommunications device can be shown to the user of the (first) telecommunications device on the display. If the further telecommunications device determines, however, that the subscriber data stored in the first telecommunications device has a lower version number (or that no subscriber data is stored in the first telecommunications device because no version number is given in the device information) and is therefore no longer up-to-date, then the current subscriber data including the new version number is transmitted. This reduces the data flow still further.

It is worth noting that both these aspects, namely negotiating required or supported components of subscriber data and using historical data, can be used either in combination with one another as is shown in FIG. 3 or independently.

Although the present invention has been described with reference to specific embodiments, those of skill in the art will recognize that changes may be made thereto without departing from the spirit and scope of the present invention as set forth in the hereafter appended claims.

The invention claimed is:

1. A method for identifying a telecommunications subscriber, the method comprising:
    signaling a call from a second telecommunications device of a second telecommunications subscriber to a first telecommunications device of a first telecommunications subscriber;
    sending device information from the first telecommunications device to the second telecommunications device which indicates a type of subscriber data that the first telecommunication device is set up to receive; and
    transmitting subscriber data from the second telecommunications device to the first telecommunications device in accordance with the device information;
    wherein at least one of the first and second telecommunications devices stores transmission information which indicates which subscriber data has been transmitted from the other respective telecommunications device;
    wherein the transmission information is assigned historical data which references the transmitted subscriber data;
    and wherein the historical data of the transmission information stored in the respective telecommunications device is incorporated into the device information to be transmitted.

2. A method for identifying a telecommunications subscriber, the method comprising:
    signaling a call from a second telecommunications device of a second telecommunications subscriber to a first telecommunications device of a first telecommunications subscriber;
    sending device information from the first telecommunications device to the second telecommunications device which indicates a type of subscriber data that the first telecommunication device is set up to receive;
    transmitting subscriber data from the second telecommunications device to the first telecommunications device in accordance with the device information, wherein the subscriber data to be transmitted is referenced to current historical data; and
    comparing the current historical data from subscriber data to be transmitted with historical data from received device information of the respective other telecommunications device, wherein the step of transmitting includes transmitting only subscriber data whose current historical data does not agree with the historical data of the received device information from the respective other telecommunications device.

3. A method for identifying a telecommunications subscriber, the method comprising:

signaling a call from a second telecommunications device of a second telecommunications subscriber to a first telecommunications device of a first telecommunications subscriber;

sending device information from the second telecommunications device to the first telecommunications device which indicates components of subscriber data that the first telecommunications device wants to receive; and transmitting subscriber data from the first telecommunications device to the second telecommunications device in accordance with the device information;

wherein at least one of the first and second telecommunications devices stores transmission information which indicates which subscriber data has been transmitted from the respective other telecommunications device;

wherein the transmission information is assigned historical data which references the transmitted subscriber data;

and wherein the historical data of the transmission information stored in a respective telecommunications device is incorporated into the device information to be transmitted.

4. A method for identifying a telecommunications subscriber, the method comprising:

signaling a call from a second telecommunications device of a second telecommunications subscriber to a first telecommunications device of a first telecommunications subscriber;

sending device information from the second telecommunications device to the first telecommunications device which indicates components of subscriber data that the first telecommunications device wants to receive;

transmitting subscriber data from the first telecommunications device to the second telecommunications device in accordance with the device information, wherein the subscriber data to be transmitted in referenced to current historical data; and comparing the current historical data from subscriber data to be transmitted with historical data from received device information of the respective other telecommunications device, wherein the step of transmitting includes transmitting only subscriber data whose current historical data does not agree with the historical data of the received device information from the respective other telecommunications device.

* * * * *